United States Patent Office 3,506,280
Patented Apr. 14, 1970

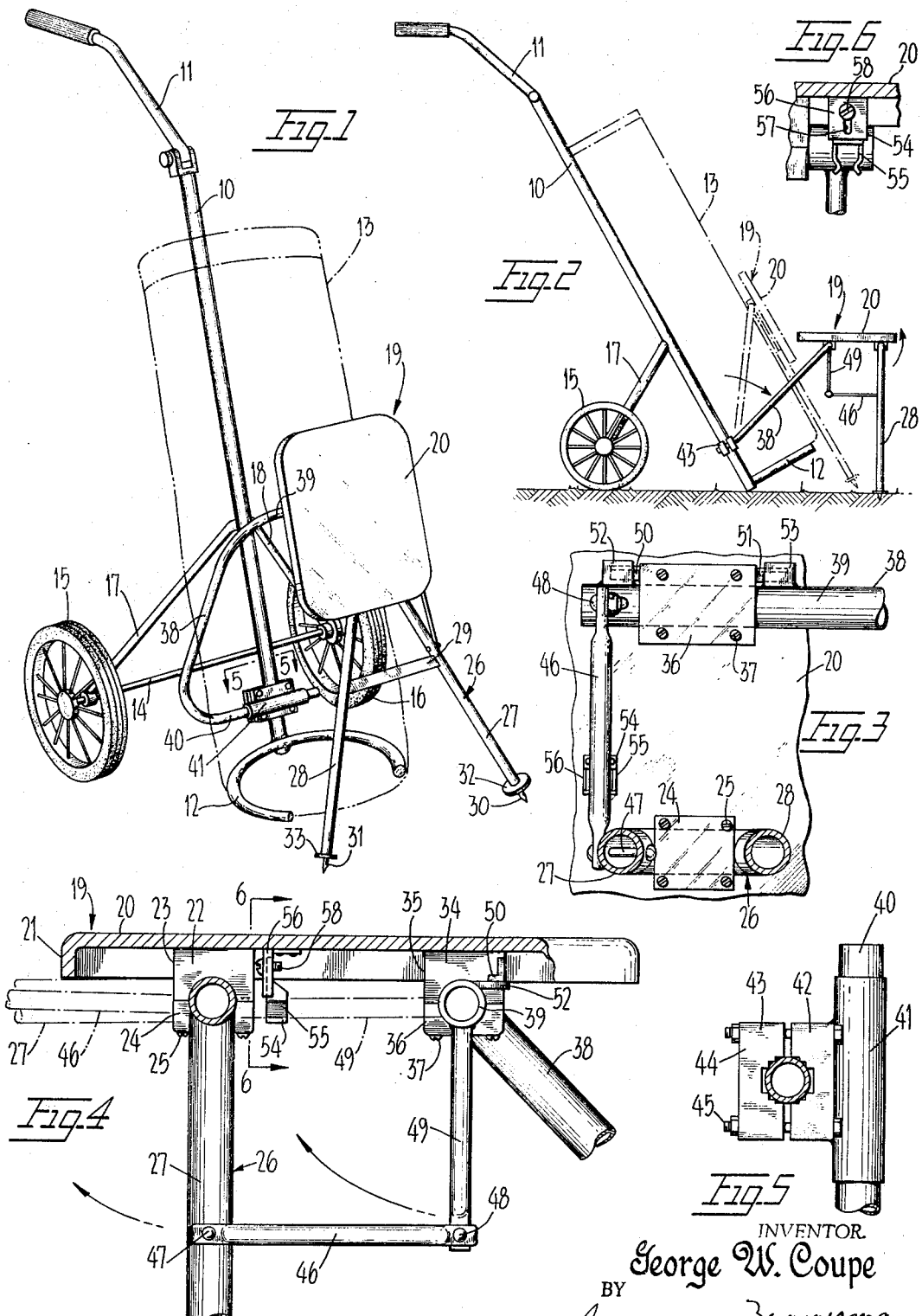

3,506,280
SEAT FOR A GOLF CART OR THE LIKE
George W. Coupe, 637 Pond Isle,
Alameda, Calif. 94501
Filed July 2, 1968, Ser. No. 741,968
Int. Cl. A63b 55/08
U.S. Cl. 280—47.19    14 Claims

ABSTRACT OF THE DISCLOSURE

A seat assembly for use with a golf cart or the like. The seat assembly includes a seat-defining platform having leg structure pivotally secured thereto, and it further includes a support arm of generally U-shaped configuration pivotally attached at one end thereof to the platform and at its other end to the frame of a golf cart through a bearing structure mounted thereon. Such pivotal interconnections of the various components enable the seat assembly to be selectively moved between an open or extended position of use and a folded or retracted position in which it lies against and generally in line with a golf bag carried by the cart. The only attachment of the seat assembly to the golf cart is through the U-shaped support arm and bearing structure so that the seat assembly can be completely removed from the golf cart simply by slidably withdrawing the support arm from such bearing support therefor. Since the arm is U-shaped, a golf bag can be mounted upon or removed from the golf cart with the seat assembly attached thereto, and adjustments are provided to enable the seat assembly to be used with different golf carts and to accommodate golf bags of various sizes.

---

This invention relates to a seat assembly for a golf cart or the like, and more particularly, to a seat assembly that is selectively movable between an open position for use and a folded position for storage, and which seat assembly is removably attached to any such golf cart with which it is associated.

Since considerable periods of inactivity occur during any game of golf and because of the prevalent use of golf carts to facilitate enjoyment of the game, a number of proposals have been made to equip golf carts with seats so that whenever a period of inactivity occurs a seat will be conveniently available for use by the golfer. So far as is known, the seat arrangements proposed have a number of disadvantages including undesirable size, weight, and general complexity and, when the seat is attached to the cart, limitation on the facility with which a bag may be removed from or positioned upon a golf cart and on the facility with which the cart can be collapsed for storage.

In view thereof, an object of the present invention is to provide an improved seat assembly for use with a golf cart or the like. Another object of the invention is in the provision of a seat assembly that is foldable and readily movable between a folded condition in which it is adjacent a golf bag carried by a golf cart and extends generally therealong, and an open condition in which it provides a platform available for use as a seat. Still another object of the invention is that of providing a foldable seat assembly as described which is quickly and easily removable from and attached to a golf cart without the requirement for tools so as to enable the seat assembly to be disassociated from the golf cart for storage (as in the trunk of an automobile) should this be required.

A further object is to provide a seat assembly of the character described which positively defines the open and folded positions thereof, which has adjustable characteristics so that it can be made to accommodate golf bags of various size and carts of different construction, and which does not interfere with removal and attachment of a golf bag to a cart equipped with the seat assembly. Additional objects and advantages of the invention, especially as concerns particular features and characteristics thereof, will become apparent as the specification develops.

An embodiment of the invention is illustrated in the accompanying drawing, in which:

FIGURE 1 is a perspective view of a golf cart equipped with a seat assembly embodying the present invention;

FIGURE 2 is a side view in elevation of the cart and seat assembly, the latter being shown in the open position thereof by full lines and in its folded position by broken lines;

FIGURE 3 is an enlarged, broken bottom plan view of the seat-defining platform of the seat assembly;

FIGURE 4 is an enlarged side view, generally in elevation but partly in section showing the seat-defining platform in its open position but with the folded position of various components being illustrated by broken lines;

FIGURE 5 is an enlarged transverse sectional view taken along the lines 5—5 of FIGURE 1; and FIGURE 6 is a broken vertical sectional view taken along the line 6—6 of FIGURE 4.

The golf cart illustrated in FIGURE 1 may be completely conventional, and the particular cart shown is a skeletal type having a main stem or post 10 equipped at the upper end thereof with an adjustable handle section 11 and provided at its lower end with a base or support 12 which, in the form shown, is somewhat circular and is adapted to seat the bottom of a conventional golf bag 13 thereon. Secured to the stem 10 and extending transversely with respect thereto is an axle 14 equipped at the opposite ends thereof with wheels 15 and 16 and stabilized in the position shown by angularly disposed struts 17 and 18. Ordinarily, a golf cart of this type is adapted to be folded to reduce the size thereof for transport and storage; and in this case not only is the handle 11 swingable downwardly along the stem 10, but the axle 14 is either segmented or movably supported by the stem 10 so that the wheels 15 and 16 can be disposed inwardly toward the stem. The structural characteristics providing such collapsibility of the cart are not shown since they perform no part of the present invention and may be wholly standard.

The removable and foldable seat assembly of the present invention is generally denoted with the numeral 19, and comprises a seat-defining platform 20 which is generally rectangular and in the form shown is essentially planar. The platform 20 may be formed of any suitable material, and as shown in FIGURE 4 may be of metal construction and have depending perimetric edge portions 21 generally normal to the plane of the platform and which not only provide smooth edges therefor but also reinforce and rigidify the same. Welded or otherwise fixedly secured to the underside of the platform 20 is a base 22 forming a part of a segmented collar 23 having a cap 24 secured to the base 22 as by cap screws 25.

Pivotally supported by the collar 23 is ground-engaging leg structure 26 which, in the form shown, is generally A-shaped and comprises outwardly and downwardly diverging legs 27 and 28 that are reinforced intermediate the ends thereof by a brace 29, and at their upper ends (which define the apex of the A) are pivotally supported by the collar 22. The legs 27 and 28 may have pointed outer extremities (as shown at 30 and 31) so as to enable the same to penetrate the ground, and they can also be equipped just above such pointed ends with annular flanges 32 and 33, respectively, which are adapted to limit penetration of the legs into the ground.

Also welded or otherwise fixedly secured to the underside of the platform 20 is a base 34 forming a part of a sleeve 35 having a cap 36 secured to the base 34 as by cap screws 37. Pivotally carried by the sleeve 35 is a support arm 38 which, as shown best in FIGURE 1, is generally U-shaped so as to span the bag 13 from front to rear thereof. The forward upper leg 39 of the support arm 38 extends into the sleeve 35 and is pivotally constrained therewithin by the cooperative engagement of the cap 36 with the base 34.

The lower rear leg 40 of the support arm 38 is slidably and pivotally received within an elongated bearing sleeve 41 welded or otherwise fixedly secured to one jaw 42 of a clamp 43 having another jaw 44 releasably secured to the jaw 42 by a plurality of bolts 45. The jaws 42 and 44 are adapted to pass therethrough the post or stem 10 of the cart, and are fixedly constrained in any position of adjustment therealong by suitable tightening of the bolts 45. Since the leg 40 of the support arm 38 is slidably received within the bearing 41, it is removable therefrom, and because the only attachment of the seat assembly 19 with the golf cart is through interconnection of the support arm 38 with the bearing 41, the seat assembly can be separated readily from the cart simply by withdrawing the leg 40 of the support arm from the bearing 41.

As shown in FIGURE 2, the seat assembly 19 is selectively movable between an open or extended position and a folded or retracted position respectively illustrated by full and broken lines; and it is evident that in moving between such two positions, the platform 20 is angularly displaced relative to the leg structure 26 and support arm 38. The leg structure and support arm have concurrent angular displacements enforced thereon by linkage comprising an arm or link 46 pivotally secured at one end by a pin 47 to the leg 27 of the leg structure 26. At its other end, the arm 46 is pivotally connected by a pin 48 to one end of an arm or link 49 which at its other end is welded or otherwise rigidly secured to the leg 39 of the support arm 38. Evidently, the linkage comprising the arms 46 and 49 cause the leg 26 and support arm 38 to pivot concurrently relative to the platform 20.

The open position of the seat assembly, as shown in FIGURE 4, is defined by stop structure comprising a pair of stop members (or a single elongated member) 50 and 51 which are carried by the base 34 of the sleeve 35 and project outwardly from the opposite ends thereof. Adapted to engage members 50 and 51 are a pair of abutments 52 and 53 fixedly secured to the leg 39 of the support arm 38 so as to be angularly displaced therewith. When the seat assembly is moved toward its open position, the abutments 52 and 53 respectively engage the members 50 and 51 and thereby constrain the seat assembly against further angular displacement in one direction and thereby establish the fully open position of the seat assembly.

The seat assembly further comprises fastener structure generally denoted with the numeral 54; and as shown best in FIGURE 6, the fastener structure comprises a spring clip 55 having spaced apart resilient legs adapted to releasably receive and grip therebetween the arm 49 of the linkage whenever the seat assembly is in the folded condition thereof, as illustrated by the broken lines in FIGURE 4. Since the extent to which the seat assembly can be folded is dependent upon the thickness or size of the golf bag 13, the clip 55 is adjustably carried by the platform 20 through an L-shaped bracket 56, one leg of which is welded or otherwise fixedly secured to the underside of the platform and the other or depending leg of which has an elongated slot 57 through which extends a cap screw 58 effective to constrain the clip 55 in any position of adjustment thereof within the limits of adjustability defined by the slot 57 and cap screw 58 extending therethrough.

In use of the cart, the seat assembly 19 is generally maintained in the folded position thereof shown by broken lines in FIGURE 2, whereupon the cart and golf bag 13 carried thereby are used in a conventional manner. The seat is maintained in such folded position by the cooperative engagement of the spring clip 55 with the linkage arm 46. Whenever it is desired to use the seat, it is simply swung outwardly, the spring clip releasing the arm 49, and into the full-line position shown in FIGURE 2 in which the leg structure 26 is generally normal to the platform 20 and the pointed ends 30 and 31 of the leg structure pierce the ground to the extent permitted by the flanges 32 and 33 so as to stabilize the seat and golf cart. Most of the weight will be carried by the leg structure 26, but any weight component appearing on the support arm 38 will be transmitted to the ground through the stem 10 of the cart which at its lower end is in engagement with the ground, as shown in FIGURE 2. Thus, no weight will be transmitted to the tires of the cart.

When the seat assembly is folded, the leg structure 26 extends generally along the platform 20 and, therefore, generally along the forward side of the golf bag 13. Since the only attachment of the seat assembly with the golf cart is through the U-shaped arm 38, the golf bag 13 can be mounted upon and removed from the cart without interference from the seat assembly since sufficient access is afforded through the open side thereof opposite the support arm 38. If for any reason it is desired to remove the seat assembly, this is quickly and easily accomplished simply by sliding the leg 40 of the support arm 38 outwardly from the bearing 41, which remains clamped to the stem 10 of the golf cart and the seat assembly is as readily reattached to the cart by inserting the arm 40 into the bearing 41.

Evidently, the bearing 41 is readily adjusted along the stem 10 of the golf cart to an appropriate location, and the seat assembly can therefore be adapted to golf carts of various construction. Also, as heretofore explained, the fastener structure 54 can be adjusted as necessary to enable the seat assembly to accommodate golf bags of different sizes.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

I claim:

1. In combination with a golf cart or the like having a wheel-equipped frame structure, a removable and foldable seat assembly comprising a seat-defining platform equipped with leg structure pivotally secured along the underside of the platform for movement with respect thereto between a folded position in which the leg structure extends generally along the platform and an open position in which the leg structure is generally normal thereto, a bearing fixedly secured to said frame structure, a support arm removably carried by said bearing for swinging movements with respect thereto, means along the underside of said platform pivotally supporting said arm for movement relative thereto between such folded and open positions, and linkage interconnecting said arm and leg structure for enforcing concurrent movements thereon relative to said platform, interconnection of said arm and bearing being the only attachment of said seat assembly to said cart so that said seat assembly can be separated from and attached to said cart by selectively removing said arm from and connecting it with said bearing.

2. The combination of claim 1 in which said support arm is generally U-shaped to straddle a golf bag carried by said cart with the opposite legs of the U being respectively connected with said bearing and said means.

3. The combination of claim 1 in which said bearing is an elongated sleeve slidably and pivotally receiving therein an end portion of said support arm.

4. The combination of claim 1 and further comprising stop structure fixedly related to said platform along the underside thereof and being engageable with one of said leg structure and support arm to limit movement thereof in one direction and thereby establish the open position of said seat assembly.

5. The combination of claim 1 and further comprising fastener structure fixedly related to said platform along the underside thereof and being releasably engageable with one of said leg structure and support arm and linkage for constraining the same with respect to said platform in the folded position of said seat assembly.

6. The combination of claim 5 in which said fastener structure is adjustably supported by said platform so as to enable said seat assembly to accommodate golf bags of various size.

7. The combination of claim 1 in which said leg structure is generally A-shaped and is pivotally related adjacent the apex thereof to said platform.

8. The combination of claim 1 in which said support arm is generally U-shaped to straddle a golf bag carried by said cart with the opposite legs of the U being respectively connected with said bearing and said means, and in which said bearing is an elongated sleeve slidably and pivotally receiving therein an end portion of said support arm.

9. The combination of claim 1 further comprising stop structure fixedly related to said platform along the underside thereof and being engageable with one of said leg structure and support arm to limit movement thereof in one direction and thereby define the open position of said seat assembly, and also further comprising fastener structure fixedly related to said platform along the underside thereof and being releasably engageable with one of said leg structure and support arm and linkage for constraining the same with respect to said platform in the closed position of said seat assembly.

10. The combination of claim 9 in which said support arm is generally U-shaped to straddle a golf bag carried by said cart with the opposite legs of the U being respectively connected with said bearing and said means, and in which said bearing is an elongated sleeve slidably and pivotally receiving therein an end portion of said support arm.

11. The combination of claim 10 in which said leg structure is generally A-shaped and is pivotally related adjacent the apex thereof to said platform.

12. The combination of claim 11 in which said fastener structure is adjustably supported by said platform so as to enable said seat assembly to accommodate golf bags of various size.

13. The combination of claim 12 and further comprising a collar secured to said platform along the underside thereof and pivotally engaging said leg structure to define the pivotal connection thereof with said platform, and in which said stop structure is carried by the aforesaid means secured to said platform and said support arm is equipped with an abutment engageable with said stop structure.

14. The combination of claim 13 in which said fastener structure comprises a spring clip releasably engageable with said linkage.

References Cited

UNITED STATES PATENTS 2,599,928   6/1952   Lyons _____ 280—47.19 X
2,944,593   7/1960   Zarnke _____ 297—217

LEO FRIAGLIA, Primary Examiner

J. A. PEKAR, Assistant Examiner

U.S. Cl. X.R.

297—217